No. 841,310.  
PATENTED JAN. 15, 1907.  
C. A. CARLSON.  
FLOUR SIFTER.  
APPLICATION FILED MAR. 19, 1906.

WITNESSES:  
D. E. Carlsen.  
E. Carlsen.

INVENTOR:  
Carl A. Carlson.  
BY his ATTORNEY:  
A. M. Carlsen.

THE NORRIS PETERS CO., WASHINGTON, D. C.

UNITED STATES PATENT OFFICE.

CARL A. CARLSON, OF UNDERWOOD, NORTH DAKOTA.

FLOUR-SIFTER.

No. 841,310.　　　　Specification of Letters Patent.　　　Patented Jan. 15, 1907.

Application filed March 19, 1906. Serial No. 306,776.

*To all whom it may concern:*

Be it known that I, CARL A. CARLSON, a citizen of the United States, residing at Underwood, in the county of McLean and State of North Dakota, have invented certain new and useful Improvements in Flour-Sifters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to flour-sifters of the class held in the hand and usually operated by either a rocking or rotating crank for sifting the flour immediately before using it; and the objects are, first, to provide this class of sifters with novel and efficient means for agitating the flour by the same hand that holds the sifter, so that the other hand may be free to stir and mix the sifted flour into the dough, soup, mush, or other preparations in which the flour is used; second, to furnish such sifter with a hinged bottom that will prevent spilling of the flour; third, to provide such sifter with legs to stand on, and, fourth, to provide such sieve with a reservoir for stone, coarse sand, and other siftings, so that they will not be grinding on the sieve nor be ground to pieces by the sieve and get mixed into the flour.

These and other objects I attain by the novel construction and arrangement of parts illustrated in the accompanying drawings, in which—

Figures 1, 2:
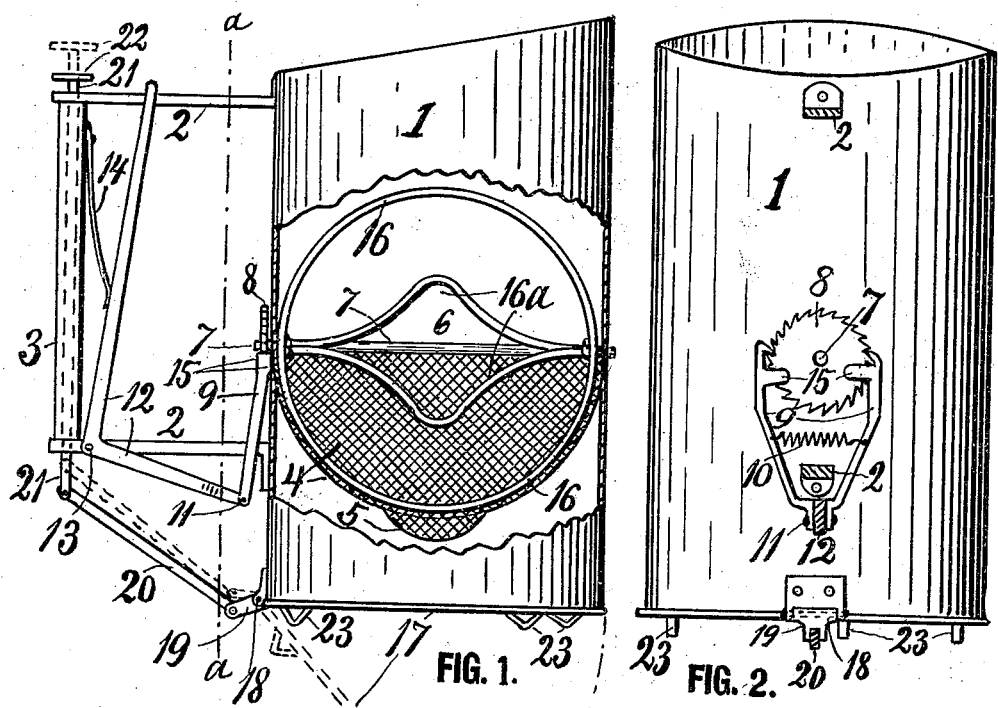
Figures 3, 4:
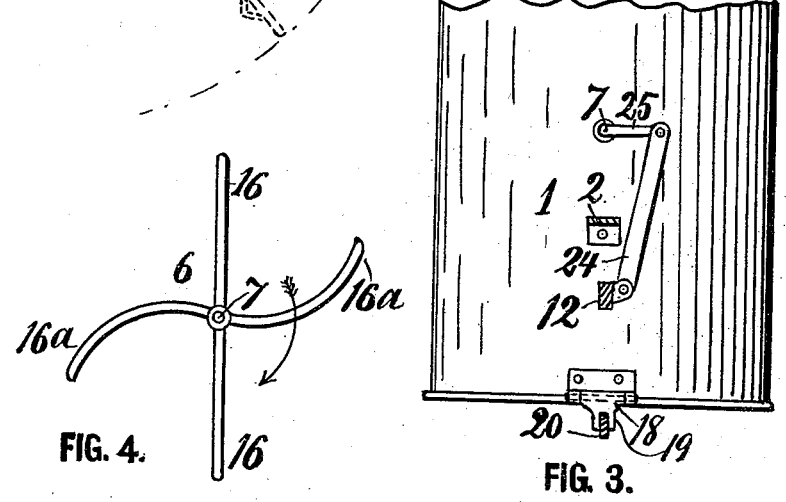

Figure 1 is a partly-sectional side elevation of my sieve in its preferred form. Fgi. 2 is a vertical sectional view on the line *a a* in Fig. 1. Fig. 3 is a modification of the lower half of Fig. 2. Fig. 4 is a detail end view of the agitator.

Referring to the drawings by reference-numerals, 1 designates the receptacle or vessel holding the flour to be sifted. Upon the rear side of the vessel is fixed, by arms 2, a vertical handle 3, by which the vessel is held in the hand. In the lower part of the vessel is fixed a hemispheric sieve 4, having in its lowest point a cavity 5 for the sand and other siftings to escape into until they can be emptied out by inverting the vessel. Fitting to operate in said sieve is an agitator-wheel 6, fixed on a shaft 7, journaled in the sides of the vessel and having outside the latter a fixed ratchet-wheel 8, revolved by two oppositely-arranged pawls 9, held toward the wheel by a spring 10, connecting them together. These pawls are pivoted at 11 to an L-shaped lever 12, which is fulcrumed at 13 and has its longest arm normally held forward by the spring 14 on the handle 3. Said pawls 9 are provided with guiding-arms 15, straddling the edge of the wheel, and thus keep the pawls always in proper engaging position with the teeth of the wheel.

The wings 16 of the agitator are semicircular, while some of them are also a kind of V-shaped in the middle, as $16^a$, for the purpose of gathering the siftings from the inner face of the sieve into the pit or reservoir 5 as soon as they have reached the sieve.

The bottom of the receptacle is closed by a lid 17, hinged at 18 and having an arm 19, connected by a link-rod 20 to a vertical push-rod 21, guided in or at the side of the handle 3, which it projects above and is there provided with a push-button 22, on which the operator presses downward with his thumb to close the lid 17 and to keep it closed until it is either to be opened or to be further held closed by setting the sifter on a table or like place, so it rests on the legs 23, provided on the under side of the lid.

From the above description it will be understood that the pawls or dogs 9 rotate the agitator constantly when they are moved up and down by the lever 12 as the latter is alternately thrown forward by the spring 14 and pressed back against the handle 3 by the fingers of the hand holding the handle.

In the modification Fig. 3 is shown how the lever 12 may be connected by a link-rod 24 to a crank or rocker arm 25, by which the shaft 7 and the agitator may thus be oscillated. This simple form is especially adapted for a cheaper grade of the article than that shown in Figs. 1 and 2.

Having thus described my invention, what I claim, and desire to secure by Letters Patent, is—

1. A flour-sifter comprising a flour-receptacle with a hemispheric sieve in its lower portion and an agitator having wings moving near the inner surface of the sieve, said sieve having in its bottom a fixed integral pit or reservoir for the sifting.

2. A flour-sifter comprising a flour-receptacle with a hemispheric sieve in its lower portion and an agitator having wings moving near the inner surface of the sieve, said sieve having in its bottom a fixed integral pit or reservoir for the sifting, some of said wings being U-shaped or V-shaped so as to gather the siftings speedily into the pit.

3. A flour-sifter comprising a vessel or receptacle, a sieve therein an agitator above the sieve, a shaft fixed in the agitator and journaled in the sides of the vessel, a handle or handhold on the receptacle, a spring-pressed lever fulcrumed within operative reach of the fingers of the hand holding the handle, and operative connection between said spring-and-finger-actuated lever and the shaft of the agitator; said operative connection consisting of a ratchet-wheel fixed on the end of the shaft and two spring-pressed pawls pivotally carried by the finger-operated lever and engaging opposite edges of the wheel and operating alternately to keep the wheel in practically constant rotation.

4. A flour-sifter comprising a vessel or receptacle, a sieve therein an agitator above the sieve, a shaft fixed in the agitator and journaled in the sides of the vessel, a handle or handhold on the receptacle, a spring-pressed lever fulcrumed within operative reach of the fingers of the hand holding the handle, and operative connection between said spring-and-finger-actuated lever and the shaft of the agitator; said operative connection consisting of a ratchet-wheel fixed on the end of the shaft and two spring-pressed pawls pivotally carried by the finger-operated lever and engaging opposite edges of the wheel and operating alternately to keep the wheel in practically constant rotation; said pawls having the guiding-arms 15 straddling the edge of the wheel for the purpose set forth.

In testimony whereof I affix my signature in presence of two witnesses.

CARL A. CARLSON.

Witnesses:
KRIST KJELSTRUP,
L. A. STINBERG.